UNITED STATES PATENT OFFICE.

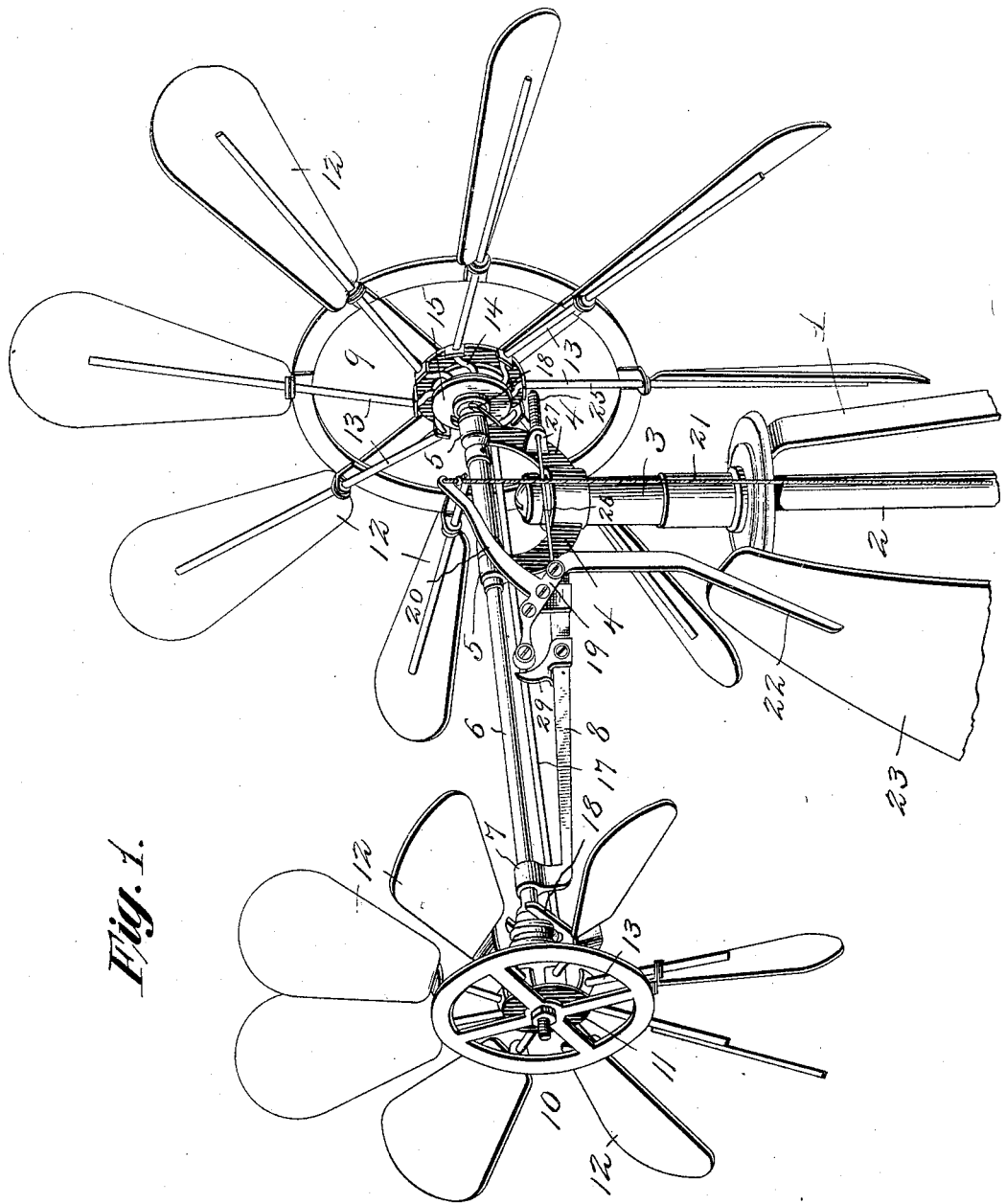

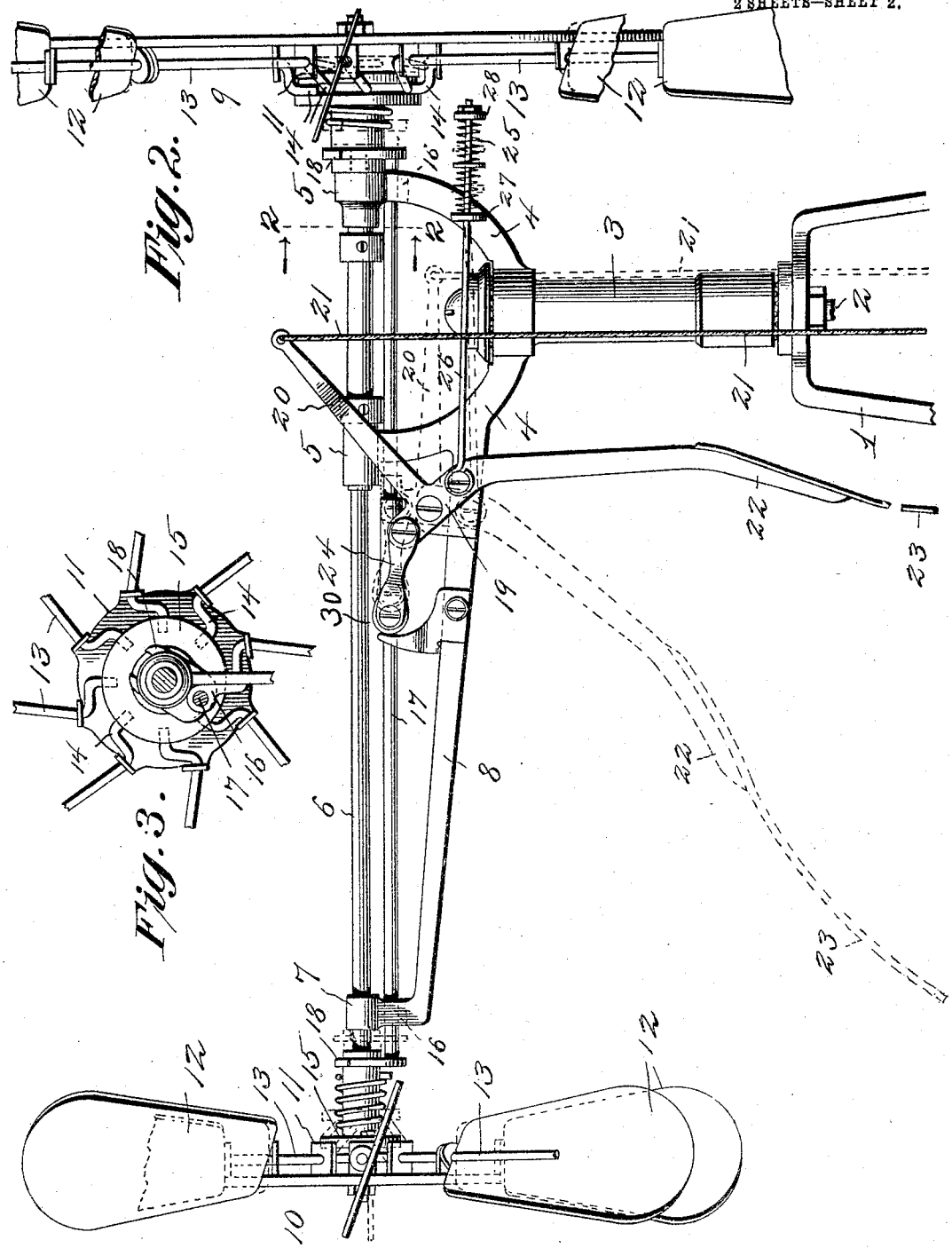

JOAQUIN MAIZ, OF MONTEREY, MEXICO.

WIND-POWER MILL.

No. 796,588.  Specification of Letters Patent.  Patented Aug. 8, 1905.

Application filed November 9, 1904. Serial No. 232,062.

*To all whom it may concern:*

Be it known that I, JOAQUIN MAIZ, a citizen of the United States, residing at Monterey, Mexico, have invented a new and useful Windmill, of which the following is a specification.

My invention relates to windmills, and has for its objects to produce a comparatively simple inexpensive device of this character having a pair of wheels arranged one in advance of the other upon a common shaft, thereby increasing the driving power of the latter, one in which said wheels will be automatically and simultaneously thrown into and out of action for controlling the speed of the shaft in accordance with wind variations, and one wherein both wheels may be positively and simultaneously thrown out of action for stopping the machine.

To these ends the invention comprises the novel features of construction and combination of parts more fully hereinafter described.

In the accompanying drawings, Figure 1 is a perspective view of a windmill embodying my invention. Fig. 2 is a side elevation of the same. Fig. 3 is a detail sectional elevation taken on the line 2 2 of Fig. 2 and looking in the direction of the arrow.

Referring to the drawings, 1 designates a windmill tower or framework of the usual or any appropriate construction, provided at its upper end with a vertical shaft 2, having mounted thereon for rotation a supporting sleeve or member 3, from the upper end of which arises a pair of spaced arms 4, in turn provided with bearings 5, which receive for rotation a horizontal shaft 6, the bearings 5 being disposed adjacent to the forward end of the shaft, which adjacent to its rear end is carried by a bearing 7, provided on the outer end of a supplemental substantially horizontal arm or bar 8, preferably formed integral with and projecting rearwardly from one of the arms 4. While the foregoing parts are by preference of the form and arrangement herein shown and described, it is to be understood that they may be of other suitable construction adapting them for the purposes in view.

Fixed respectively upon opposite ends of the shaft 6 for driving the latter is a forward primary wheel 9 and a rear secondary wheel 10, of which the forward primary wheel is largest in order that the wind passing through the framework thereof may be caught by the smaller wheel. As the wheels are, except in a matter of size, identical in construction and operation, I will describe but one in detail. Each wheel comprises a fixed supporting web or spider 11 and a series of pivoted sails or blades 12, the pivotal shafts or axles 13 of which are mounted in suitable bearings provided on the spider and have their inner ends angularly bent, as shown, to produce crank arms or portions 14, adapted for engagement with a continuous peripheral groove or guideway formed in a sleeve or collar 15, disposed for longitudinal sliding movement upon the shaft 6. It is to be noted that under this construction outward movement of the member or sleeve upon the shaft will rotate the blades 12 for bringing them edgewise to the wind and decreasing or stopping the rotation of the wheel.

Slidingly mounted in bearings 16, provided on the support, is an operating rod or element 17, carrying at its opposite terminals fixed bifurcated members or forks 18, which straddle, respectively, the sleeves 15 and seat within suitable grooves formed in the latter, whereby the sleeves are connected for simultaneous movement upon the shaft to throw the blades of the wheels 9 and 10 simultaneously into and out of action upon longitudinal movement of the rod.

Pivoted to the arm 8 of the support is an operating member or lever, preferably in the form of a bell-crank 19, fulcrumed at its elbow and having a forwardly and upwardly extending arm or portion 20, to the outer end of which is attached a traction cord or element 21 and a substantially vertical depending arm or portion 22, carrying a fixed blade or sheet constantly presented facewise to the wind. The bell-crank 19 is operatively connected with the rod 17 by means of a link 24, whereby as the bell-crank rocks upon its pivot in the manner presently explained the rod will be moved forwardly with respect to the shaft 6 for moving the sails 11 to inactive position.

The bell-crank is maintained in normal position by means of a spring 25 encircling the forward end of a rod or link 26, pivoted to the bell-crank and working between its ends in a bearing 27, provided on one of the arms 4, the spring 25 being adapted to bear at its ends, respectively, against the bearing 27 and a head 28, fixed upon the forward end of the rod. The forward movement of the bell-crank under the influence of the normally expanded spring 25 is limited by means of a pair of coöperating stops or abutments 29 30, carried, respectively, by the supporting-bar 8 and operating-rod 17.

In practice, the parts being in normal position, the blades 11 will receive the impact of the wind for driving the wheels and shaft 6. When, however, the force of the wind increases beyond a certain predetermined limit, it will, through its action upon the blade 23, overcome the tension of spring 25 and actuate the bell-crank, which, through the medium of its connection with the rod 17, will move the blades 11 to inactive position and decrease the rate of speed of the wheels. As the wind force decreases the spring 25 will again move the parts to normal position and throw the sails 11 into action. When it is desired to throw the machine out of operation, downward traction is exerted upon the element 21, as will be readily understood.

From the foregoing it is apparent that I produce a simple inexpensive device in which the speed of the wind-wheels during operation will be wholly and automatically controlled by the action of the wind and one in which the device may be positively thrown out of operation when desired. In attaining these ends it is to be understood that minor changes in the details of construction herein set forth may be resorted to without departing from the spirit of the invention.

Having thus described my invention, I claim and desire to secure by Letters Patent of the United States—

1. In a windmill, a sleeve supported for rotation, a shaft journaled in arms connected with said sleeve, frames or spiders at the ends of said shaft, sail-carrying rods supported pivotally upon said spiders and having crank-arms at their inner ends, sleeves supported slidably upon the shaft and having annular grooves for the reception of said crank-arms, a slidable rod supported parallel to the axis of the shaft and having bifurcated ends engaging grooves in the sleeves, spring means for actuating said rod in one direction, and a vane and connecting means for actuating said rod against the tension of the spring.

2. In a windmill, a sleeve supported for rotation and having shaft-supporting arms, a wind-wheel-carrying shaft, sleeves mounted slidably upon said shaft and connected with the sails of the wheels to adjust the position thereof, a rod connecting said sleeves, a bell-crank lever fulcrumed upon the shaft-supporting frame, a link connecting one arm of said bell-crank with the adjusting-rod, a vane upon the other arm of the bell-crank, and stops disposed upon the adjusting-rod and upon the shaft-supporting frame to limit the movement of said adjusting-rod.

In testimony that I claim the foregoing as my own I have hereto affixed my signature in the presence of two witnesses.

JOAQUIN MAIZ.

Witnesses:
PEDRO LAMBRETON,
M. VIZCAYA.